United States Patent
Molva et al.

[11] Patent Number: 5,495,494
[45] Date of Patent: Feb. 27, 1996

[54] SELF-ALIGNED, MONOLITHIC, SOLID MICROLASER WITH PASSIVE SWITCHING BY A SATURABLE ABSORBER AND A PRODUCTION PROCESS THEREFOR

[75] Inventors: Engin Molva, Grenoble; Jean-Jacques Aubert, Sassenage; Jean Marty, Seyssins; Jean-Michel Nunzi, Amtomy, all of France

[73] Assignee: Commissariat a l'Energie Atomique, Paris, France

[21] Appl. No.: 339,706

[22] Filed: Nov. 14, 1994

[30] Foreign Application Priority Data

Nov. 15, 1993 [FR] France .................................. 93 13564

[51] Int. Cl.$^6$ .................................................. H01S 3/113
[52] U.S. Cl. .................................................. 372/98
[58] Field of Search .......................... 372/11, 98, 10, 372/12

[56] References Cited

U.S. PATENT DOCUMENTS

| | | |
|---|---|---|
| 4,191,931 | 3/1980 | Kuppenheimer . |
| 5,119,382 | 6/1992 | Kennedy et al. . |
| 5,278,855 | 1/1994 | Jacobovitz-Veselka et al. ......... 372/11 |

FOREIGN PATENT DOCUMENTS 1566716  5/1980  United Kingdom .

OTHER PUBLICATIONS

Optics Letters, vol. 18, No. 18, Sep. 15, 1993, Y. Tsou, et al., "Passive Q Switching Of Nd:YAG Lasers By Use Of Bulk Semiconductors", pp. 1514–1516.
Appl. Phys. Lett., vol. 59, No. 27, Dec. 30, 1991, N. Mermilliod, et al., "LaMgAl11O19:Nd Microchip Laser", pp. 3519–3520.
The Lincoln Laboratory Journal, vol. 3, No. 3, Dec. 1990, pp. 427–445, J. J. Zayhowski, "Microchip Lasers".
Optics Communications, vol. 10, No. 1, Jan. 1974, pp. 18–20, K. H. Drexhage, et al., "New Dye Solutions For Mode–Locking Infrared Lasers".
Mol. Cryst. Liq. Cryst., 1990, vol. 183, pp. 291–302, U. T. Mueller–Westerhoff, et al., "Near–IR Dyes For the 1.3 To 1.5 Micron Region: The Use of Substituted Dithiolene Compleses" no month.
NTIS AN: AD–A024 442/6, May 9, 1974–Nov. 15, 1975, R. Wisnieff, et al.
Appl. Phys. Lett., vol. 62, No. 22, May 31, 1993, Kalin Spariosu, et al., "Er:Ca5(P04)3F Saturable–Absorber Q Switch For The Er:Glass Laser At 1.53 µm", pp. 2763–2765.
Optics Letters, vol. 18, No. 7, Apr. 1, 1993, Shouhuan Zhou, et al., "Monolithic Self–Q–Switched Cr,Nd:YAG Laser", pp. 511–512.
Optics Letters, vol. 17, No. 17, Sep. 1, 1992, J. J. Zayhowski, et al., "Diode–Pumped Microchip Lasers Electro–Optically Q Switched at High Pulse Repetition Rates", pp. 1201–1203.

*Primary Examiner*—Rodney B. Bovernick
*Assistant Examiner*—Robert E. Wise
*Attorney, Agent, or Firm*—Oblon, Spivak, McClelland, Maier & Neustadt

[57] ABSTRACT

A self-aligned, monolithic, solid microlaser with passive switching by a saturable absorber and a production process therefor. The cavity for the microlaser has a solid active medium, a saturable absorber, an entrance mirror and an exit mirror, wherein the saturable absorber is a thin film of saturable absorbent material directly deposited on the solid active medium.

28 Claims, 4 Drawing Sheets

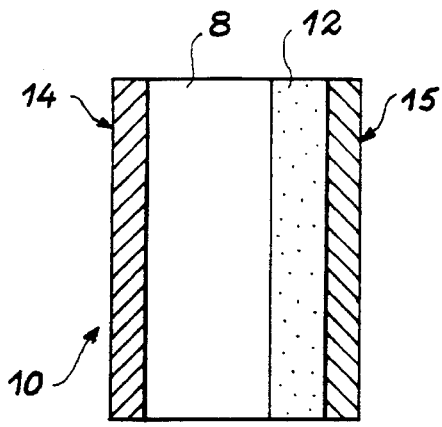
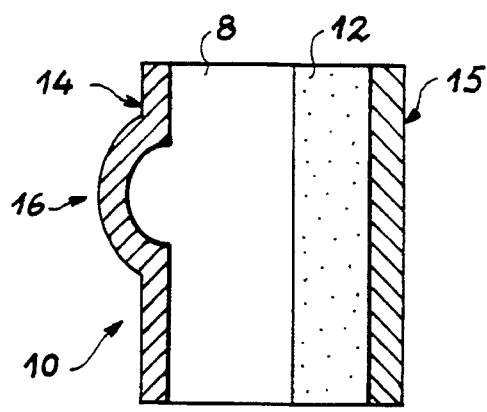
FIG. 2a  FIG. 2b
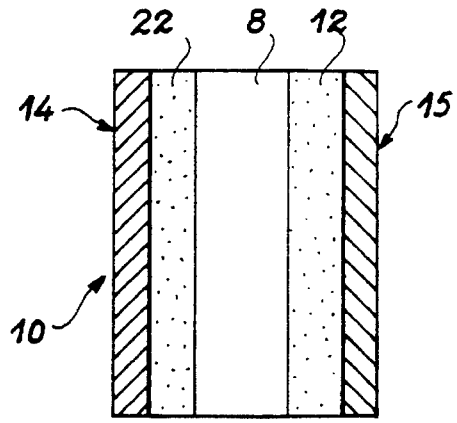
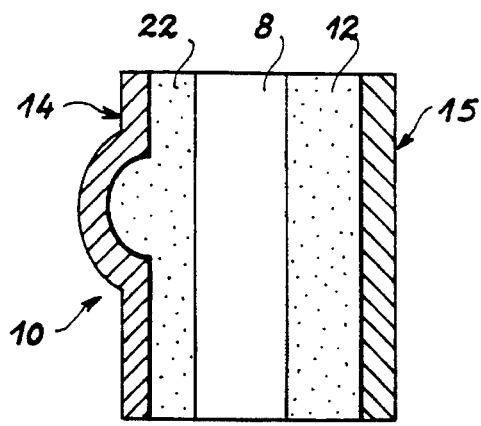
FIG. 4a  FIG. 4b
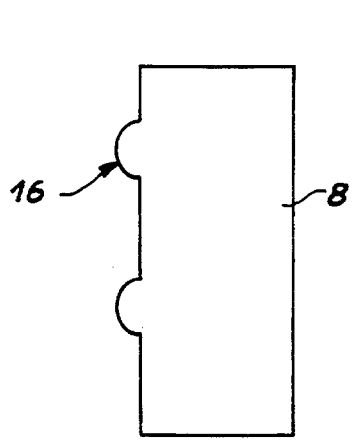
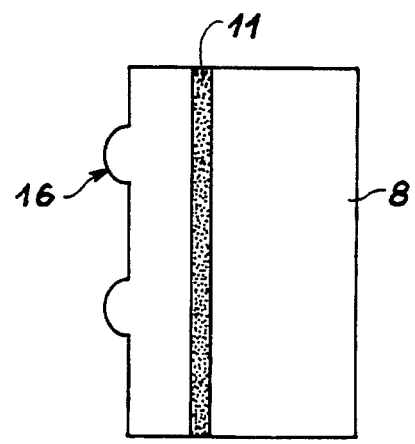
FIG. 5a  FIG. 5b

SELF-ALIGNED, MONOLITHIC, SOLID MICROLASER WITH PASSIVE SWITCHING BY A SATURABLE ABSORBER AND A PRODUCTION PROCESS THEREFOR

BACKGROUND OF THE INVENTION

1. Field of the Invention

The present invention relates to a solid microlaser, a cavity for said microlaser and a process for the production of said cavity.

2. Discussion of the Background

The main advantage of the microlaser (cf. publications 1 and 2 listed at the end of the present description) is its structure in the form of a stack of multilayers, which constitutes its essential characteristic. The active laser medium is constituted by a material having a limited thickness of between 150 and 1000 µm and of small dimensions (a few mm$^2$), on which are directly deposited dielectric cavity mirrors. This active medium can be pumped by a III–V laser diode, which is either directly hybridized on the microlaser, or coupled to the latter by an optical fiber. The possibility of a collective manufacture using microelectronics means authorizes a mass production of said microlasers at very low cost.

Microlasers have numerous applications in fields as varied as the car industry, the environment, scientific instrumentation and telemetry.

Known microlasers generally have a continuous emission of a few dozen mW of power. However, most of the aforementioned applications require peak powers (instantaneous power) of a few kW supplied for $10^{-8}$ to $10^{-9}$ seconds, with an average power of a few dozen mW. In solid lasers, it is possible to obtain such high peak power levels by making them operate in the pulsed mode at frequencies between 10 and $10^4$ Hz. For this purpose use is made of well known switching processes, e.g. by Q-switch (publication 3 given at the end of the description).

More specifically, the switching of a microlaser cavity consists (publication 3) of adding thereto losses which are variable in time which will prevent the laser effect for a certain time during which the pumping energy is stored in the excited level of the gain material. These losses are suddenly reduced at precise moments, thus releasing the stored energy in a very short time (giant pulse), so that a high peak power is obtained.

In the case of a so-called active switching, the value of the losses is controlled externally by the user (e.g. a rotary cavity mirror of an intracavity electro-optical or acousto-optical type changing either the path of the beam or its polarization state). The storage time, the opening time of the cavity and the repetition rate can be chosen independently. However, this requires adapted electronics and considerably complicates the laser system.

In the case of so-called passive switching, variable losses are introduced into the cavity in the form of a material known as a saturable absorber (SA), which is highly absorbent at the laser wavelength and a low power density and which becomes virtually transparent when said density exceeds a certain threshold, which is called the saturation intensity of the SA.

In particular, passive switching using solid saturable absorbers (publications 4 and 5) or saturable absorbent polymers (publications 7 and 8) has already been performed.

The known saturable absorbers often contain organic molecules, which are responsible for the absorption. These materials are generally in liquid or plastic form and therefore frequently have a poor optical quality, very rapid aging and a poor resistance to the laser flux (publication 3).

Solid materials are also used as saturable absorbers. These solid materials are obtained by crystal growth and are doped with saturable absorbent ions such as $Cr^{4+}$ (publication 5) or $Er^{3+}$ (publication 6).

In certain cases, the same material (e.g. YAG) obtained by crystal growth simultaneously contains the active laser ions (e.g. Nd) and the saturable absorber ions (e.g. Cr) (publication 4).

In known lasers passively switched with the aid of these saturable absorbers, the following arrangements have been proposed for the interior of the laser cavity.

1. A first arrangement is illustrated in FIG. 1$a$, in which 1 represents a laser cavity, 2 the active laser material, 3 the saturable absorber and 4,5 the entrance and exit mirrors of the cavity (publication 3). There is no contact between the saturable absorber 3 on the one hand and the other elements of the cavity 1 on the other.

In this type of device, it is necessary to optically align the elements of the cavity. Moreover, optical settings may be necessary when the laser is in use.

2. In the arrangements illustrated by FIGS. 1$b$ and 1$c$, a contact is ensured between the saturable absorber 3 and a mirror 4 (FIG. 1$b$) or the active laser material 3 (FIG. 1$c$) with the aid of an optical adhesive 6 (publication 7). However, the adhesive introduces a residual absorption factor and index differences at the interface between the adhesive and the adhered materials. Moreover, a possible parallelism defect between the adhered elements can also form the source of losses in the laser cavity.

3. FIGS. 1$d$ and 1$e$ illustrate a third possible arrangement (publication 4), where 2 represents the active laser material, but the latter is codoped with active laser ions and saturable absorber ions. Therefore the same material then serves as the active medium and the saturable absorber medium. Thus, it is impossible to independently regulate the properties of the laser material and the saturable absorber.

The thickness of the medium influences both the absorption of the saturable absorber and the absorption of the active laser ions, as well as influencing the structure of the laser modes.

Moreover, the absorption coefficients of the active laser ions and saturable absorbers are directly linked with the concentrations of said ions, which are definitively fixed during the growth of the crystals and cannot be subsequently modified. Thus, a new crystal must be produced for each laser configuration.

Finally, in the case of passively switched lasers where the same ion (e.g. Er) is used both for the laser action and as the saturable absorber, it is impossible to use this codoping method. Thus, the same ion could serve as the active ion or as the saturable absorber ion, provided that the concentrations differ very widely. For the saturable absorber, the concentration must be much higher than for the active laser material.

SUMMARY OF THE INVENTION

The invention relates to a novel microlaser cavity having a solid active material for the microlaser making it possible to solve the different problems mentioned hereinbefore. The invention also relates to a process for the production of said microlaser cavity, as well as a microlaser incorporating the latter.

In order to obviate the aforementioned problems, the invention proposes depositing the saturable absorber in thin film form directly on the active material of the microlaser.

More specifically, the invention relates to a cavity for a microlaser having a solid, active medium, a saturable absorber, an entrance or input mirror and an exit or output mirror, characterized in that the saturable absorber is a thin film of saturable absorbent material directly deposited on the solid, active material.

One of the main advantages of the invention is in the structure of the switched microlaser (or laser microsystem consisting of a microlaser associated with microoptics), which consists of a stack of layers or films, making it possible to retain the possibility of low cost, collective manufacture. This multilayer structure does not prejudice the simplicity and collective production processes, i.e. the low costs of the microlasers, such as have been developed for continuous microlasers. It makes it possible to produce self-aligned, monolithic, passively switched microlasers (without any optical setting) and which cannot be deregulated. This structure requires no adhering operation or complex alignment operation.

Another advantage of the microlaser compared with the "codoped" laser is that the active medium is separated from the saturable absorber, while avoiding the adhesion of the two media and while retaining a monolithic structure. Thus, it is possible to independently adjust the thicknesses (during the deposition of the layers or by mechanical thickness reduction following the deposition of the layers) and the concentrations of the ions in the two media and on the other, as a result of said separation, produce switched lasers where the same ion (e.g. Er) can be used as the active ion and as the saturable absorber, with different concentrations.

The basic laser material can be chosen from among:

$Y_3Al_5O_{12}$ (or "YAG"), $LaMoAl_{11}O_{12}$ (or "LMA"), $Y_2SiO_5$ (or "YSO"), $GdVO_4$, $YVO_4$, $YLiF_4$ (or "YLF"), or other known materials, doping being assured by ions of neodymium (Nd), erbium (Er), ytterbium (Yb), thulium (Tm), holmium (Ho), or by an Er+Yb (erbium+ytterbium) or Tm+Ho (thulium+holmium) codoping, or by other known ions.

According to a first preferred embodiment of the invention, the thin film is constituted by an organic dye dissolved in a polymer solvent. More specifically, the organic dye is chosen from among bis(4-diethylaminodithiobenzyl) nickel or bis(4-dimethylaminodithiobenzyl)-nickel and the solvent is a solution of polymethyl methacrylate (PMMA), polyvinyl alcohol, polyvinyl acetate or polystyrene.

According to a second preferred embodiment of the invention, the thin film can be deposited by liquid phase epitaxy. More specifically, the film can be deposited by liquid phase epitaxy, the film being constituted by a basic material, identical to that of the solid, active material and doped with $Cr^{4+}$ or $Er^{3+}$ ions.

Liquid phase epitaxy makes it necessary to use a base material identical to that in the substrate, or at least a material whose crystal structure (lattice) is close to that of the material used as the substrate. A $Cr^{4+}$ doping is used for a 1.06 μm laser and an $Er^{3+}$ doping for a 1.5 μm laser.

Among the two possibilities of the invention (polymer or epitaxied film), the advantages and disadvantages are given below.

With regards to the polymer it is possible to deposit on any random laser material, but the damage threshold is lower and makes it necessary to operate with lower energy levels than in the case of epitaxied films. Moreover, the index difference between the laser material and the polymer introduces an optical interface between the two media.

With regards to epitaxied films the damage threshold is as high as that of the laser material. However, as explained hereinbefore, it is only possible to carry out epitaxy on the same material (e.g. YAG on YAG) or on a material having a crystal structure (lattice) close to that of the deposited material. This limits the extent of applications. However, it is possible to adjust the index of the epitaxied film to that of the active laser medium (serving as the epitaxy substrate) in order to avoid the formation of an optical interface between the two media. The epitaxied film will also have the same qualities as the substrate.

In both cases, there is no adhesion between the active material and the saturable absorber film. Thus, problems associated with residual absorption, index differences or possible parallelism defects do not occur.

In a thin film (polymer or epitaxied film), the thickness of the saturable absorber films or layers can be much smaller than in the case of solid saturable absorbers. Thus, a few microns (1–10 μm) of polymer or a hundred microns (1–500 μm) of epitaxied film are sufficient for obtaining a correct absorption coefficient for the operation of the laser. Thus, as a result of this limited thickness, the monolithic microlaser has small overall dimensions.

According to another possibility provided by the invention, the microlaser cavity as defined hereinbefore has a second saturable absorber film.

In order to obtain a complete laser cavity on the input face can be provided a dichroic mirror produced by a deposit of dielectric multilayers and on the exit face, above the SA layer, an exit mirror, produced in the same way.

It is also possible to provide an array of microlenses directly etched on the laser material, under the deposit of dielectric multilayers forming the entrance mirror.

The invention also relates to a microlaser having a cavity of the type defined hereinabove and optical pumping means for the active, solid medium. Advantageously, the pumping means will be constituted by at least one laser diode.

All of said elements forming the microlaser can be integrated into an assembly box or case or a mechanical support. Alternatively, it would be possible to have a first case containing the microlaser cavity, a second case containing the optical pumping means and an optical connection of the optical fiber type between the two cases.

The invention also relates to a process for the production of laser microcavities, as defined hereinbefore. This process involves the following stages:

a conditioning stage, with a predetermined thickness, of the material constituting the solid, active medium, a stage of forming a thin saturable absorber film, directly on one of the faces or on both faces of the material prepared according to the preceding stage.

According to a first preferred embodiment of the above process, the thin film will be deposited with a whirler. It would preferably be formed from an organic dye dissolved in a polymer solvent.

The organic dye will be chosen from among bis(4-diethylaminodithiobenzyl)-nickel or bis(4-dimethylaminodithiobenzyl)-nickel and the solvent will be a solution of polymethyl methacrylate (PMMA), polyvinyl alcohol, polyvinyl acetate or polystyrene.

This production process only uses simple production stages and offers the possibility of mass production at low cost of laser microcavities. Once again there is no need for an optical alignment of the cavity elements.

According to another preferred embodiment of the process, the thin film will be deposited by liquid phase epitaxy.

The thin film will be formed from a base material identical to that of the active laser medium, said base material being doped with $CR^{4+}$ $Er^{3+}$ ions. It would therefore be sufficient to use a material with a crystal structure (lattice) close to that of the material on which the deposit is made.

Said embodiment offers the same advantages as the embodiment described hereinbefore, simple, economic performance without any alignment or adhesion.

Advantageously, it is possible to add to the above process a supplementary stage of forming an array of microlenses directly on the surface of the laser material. In particular, said microlenses could be directly etched on the laser material.

Finally, it would also be possible to provide a stage of forming an entrance or input mirror and an exit or output mirror of the cavity by depositing dielectric multilayers.

These two supplementary stages in no way reduce the simplicity of performing the process and do not make it less economic.

BRIEF DESCRIPTIONS OF THE DRAWINGS

The invention is described in greater detail hereinafter relative to non-limitative embodiments and with publication to the attached drawings, wherein:

FIGS. 1a to 1e, already described, diagrammatically show various possible arrangements of a laser microcavity according to the prior art.

FIGS. 2a and 2b show a microlaser cavity according to the invention in the plane-plane mode (FIG. 2a), or concave plane (FIG. 2b), with a saturable absorber film.

FIGS. 4a and 4b illustrate a microlaser cavity according to the invention in the plane-plane mode (FIG. 4a) or concave plane (FIG. 4b), with two saturable absorber films.

FIGS. 5a and 5b show a microlens array on the active laser material deposited directly by etching on said material (FIG. 5a) or firstly deposited on another material and then hybridized on a polished face of the laser material (FIG. 5b).

DESCRIPTION OF THE PREFERRED EMBODIMENTS

Figure 1A:
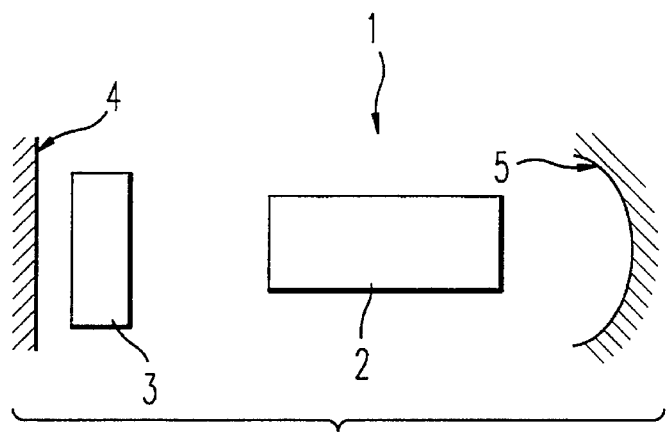
Figure 1B:
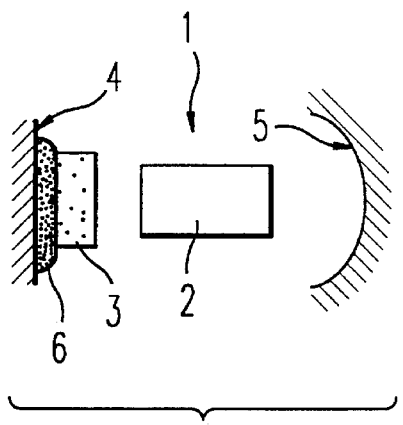
Figure 1C:
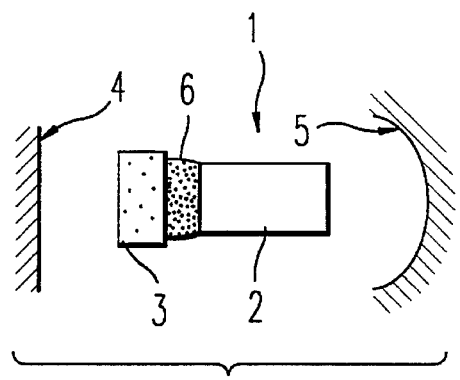
Figure 1D:
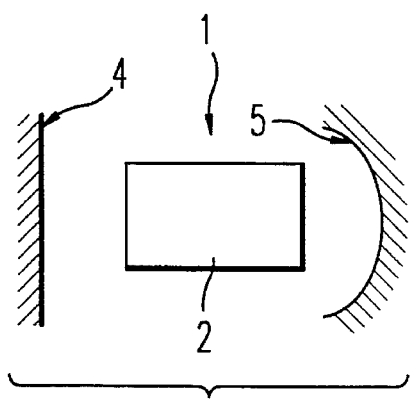
Figure 1E:
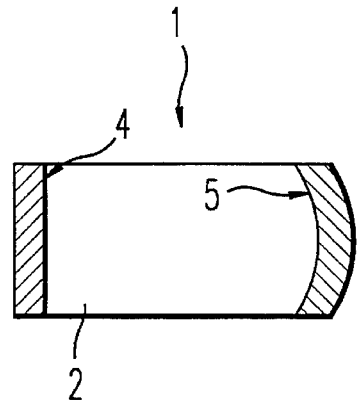

The invention relates to a microlaser cavity having a solid, active medium, as well as a saturable absorber directly deposited in the form of a thin film on said medium. A preferred embodiment of said structure is illustrated in FIG. 2a, where the active medium 8 and the saturable absorber film 12 are located between two mirrors 14 and 15 which close the laser cavity. Reference numeral 10 designates the overall cavity.

In a conventional manner, the material forming the active material 8 will be doped with neodymium (Nd) for a laser emission around 1.06 μm. The material could be chosen e.g. from among the following materials: YAG ($Y_3Al_5O_{12}$), LMA ($LaMgAl_{11}O_{19}$), $YVO_4$, YSO ($Y_2SiO_5$), YLF ($YLiF_4$) or $GdVO_4$. This choice will be conditioned by the following criteria, but will also be a function of the applications.

(1) As will be shown hereinafter, the laser cavity 1 will be optically pumped, preferably with one or more laser diodes. Therefore, a first criterion is a high absorption coefficient at the wavelength of the pump (e.g. III–V laser diode emitting at around 800 nm in order to increase the pumping efficiency, while retaining a limited material thickness of <1 mm).

(2) A wide absorption band at the wavelength of the pump at about 800 nm in order to deal with the problem of the wavelength stabilization of the laser diode and thus simplify the choice and electrical control of the laser pumping diode.

(3) A large effective cross-section of stimulated emission in order to obtain high output power levels and efficiency.

(4) A limited emission band width in order to easily obtain a monofrequency laser or, conversely, a wide emission band in order to obtain a frequency-tunable laser emission.

(5) Good thermomechanical properties in order to simplify the machining of the material and to limit the thermal effects which are prejudicial for a good dissipation of the heat produced by the absorption of the pump (said excess heat depending on the energy efficiency of the laser).

(6) A long service life in the excited state for a high energy storage or a short life for a rapid switching rate.

(7) Large dimensions in order to be able to simultaneously collectively manufacture the largest possible number of microlasers with one laser crystal.

In general, none of the known materials satisfy all these criteria simultaneously. However, among the known materials, those which are best adapted to the operation of the microlaser (with comparable life periods of a few hundred microseconds) are:

$YVO_4$, which has a high coefficient and wide absorption band, as well as a good effective cross-section, but its thermal conductivity is poor and it is only obtained in small sizes and is fragile;

YAG, which has an average absorption coefficient and stimulated emission effective cross-section and whose emission and absorption band widths are small, but it is available with large dimensions and a good thermal conductivity and doped with neodymium (Nd), it is the best known solid laser material and is the most widely used at present;

LMA, which offers low absorption coefficient and effective cross-section, wide emission and absorption bands, has a large size, but has poor thermal conductivity.

For emissions at other wavelengths different materials and dopants will be chosen. In general, the active ions are chosen from among:

Nd for an emission around 1.06 μm,

Er or an erbium-ytterbium Er+Yb codoping for an emission around 1.5 μm,

Tm or Ho or a thulium-holmium codoping for an emission around 2 μm.

Figure 3A:
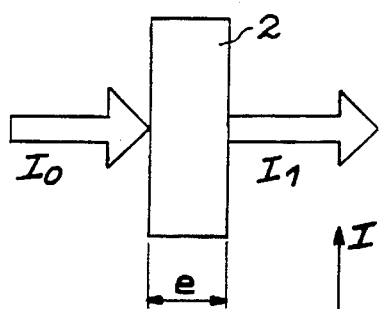
FIGS. 3a and 3b show the distribution of the modes in a plane-plane Fabry-Perot cavity of thickness e.
Figure 3B:
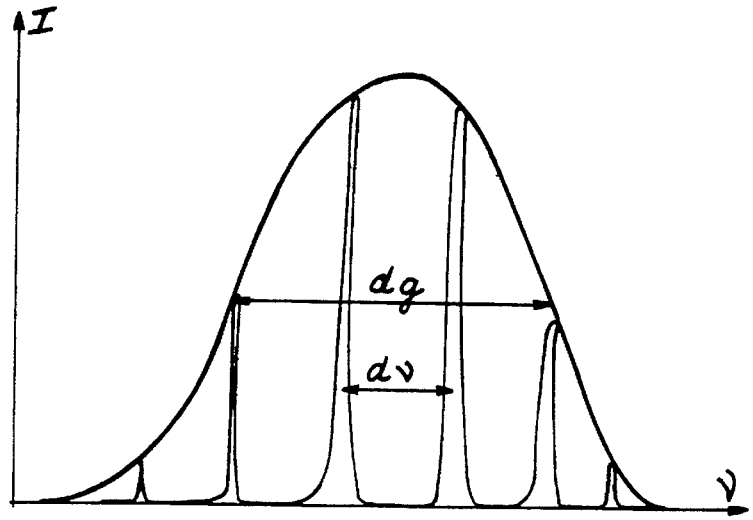

Another decisive parameter is the thickness e of the active medium 2. For further details reference should be made to FIGS. 3a and 3b showing on the one hand a laser amplifier medium 2 of width e and on the other a spectral distribution diagram of the Fabry-Perot modes of the amplifier medium. In said diagram, the envelope of the modes represents the gain band, dg represents the width of the gain band and dv the spacing of the modes. On the vertical axis is plotted the intensity in arbitrary units, while the abscissa is a frequency scale.

The thickness e conditions the characteristics of the microlaser. On the one hand, the greater the thickness, the stronger the absorption of the pumping beam. Thus, if Io is the intensity of the incident pumping on the entrance face and a the absorption coefficient, the absorbed intensity on the thickness e is given by:

$$I \text{ absorbed} = Io(1-e^{-ae}),$$

and on the other the number of longitudinal modes of a Fabry-Perot cavity increases with the thickness and, if it is wished to produce a longitudinal monomode laser, said thickness must be small. Thus, in a plane-plane Fabry-Perot cavity of thickness e, the free spectral interval dv between two Fabry-Perot modes is given by:

$$dv=c/2e$$

with c being the speed of light. If dg is the width of the gain band (of laser emission) of the material, the number of modes N will be given by:

$$N=dg/dv.$$

Thus, for a given material (with a and dg given), when e increases, the absorption of the pump increases, but so does N. For a monofrequency laser, generally a minimum thickness is chosen for N=1, provided that said thickness is >100 µm. The typical thicknesses for obtaining a single mode are:

YAG L=750 µm,

YVO$_4$ L=500 µm,

LMA L=150 µm.

In practice, the thickness e will consequently vary between 100 µm and 5 mm.

The saturable absorber 12 (FIGS. 2a and 2b) is in the form of a thin layer or film. Two film types can be used, namely a polymer containing molecules of saturable absorber. Typically for a microlaser at 1.06 µm, it is possible to use as the saturable absorber an organic dye such as bis(4-diethylaminodithiobenzyl)-nickel or BDN (Kodak, CAS No. 51449-184) in a solution containing by weight 6% polymethyl methacrylate (PMMA) in chlorobenzene.

Other polymers such as polyvinyl alcohol, polyvinyl acetate or polystyrene can be used in their respective solvents in place of PMMA. It is also possible to use bis(4-dimethylami-nodithiobenzyl)-nickel or BDN (Kodak, CAS No. 38465-55-3) as the dye.

The dye can also be incorporated into a silica gel or can be grafted on the polymer chain.

Numerous other metal complexes of dithienes can be used as the dye (publications 8 and 9)

The method can also be used for switching lasers operating at wavelengths other than 1.06 µm. For example, lasers doped with erbium or with an Er$^+$Yb complex emitting at around 1.5 µm will be switched with tetraethyl-octahydrotetraazapenta-phene-dithiolato-nickel (publication 9). This type of solution will be deposited directly on the laser material using the whirler (cf. hereinafter for the preparation process). This gives films with a thickness of approximately 1 to 5 µm.

Another type of thin film will be obtained by liquid phase epitaxy (LPE), directly on the laser material or by any other process making it possible to obtain the same deposit (same material, same doping, same properties), so that in more general terms the film can be obtained by LPE. The LPE preparation process is described hereinafter and makes it possible to obtain on the substrate 1 constituted by the solid, active medium a film thickness between 1 and 500 µm. It is constituted by a base material identical to the base material of the solid, active medium (e.g. YAG), but it is doped with ions giving it saturable absorber properties, e.g. of $Cr^{4+}$ for a 1.06 µm laser or $Er^{3+}$ for a 1.5 µm laser.

Thus, the type of dopant is adapted to the laser which it is wished to switch, so that the epitaxied film has a saturable absorption at the emission wavelength of said laser. Therefore the active laser material and saturable absorber film have the same crystal structure and only differ by the dopants which affect the crystalline and optical properties of said two media. The properties of the film in the two cases will differ very significantly.

Thus, the damage threshold is defined for each film type. Beyond a certain power density in the laser cavity, it is possible to destroy the saturable absorber film. This limit power density, called the damage threshold, will be lower in the case of the polymer with the organic dye than in the case of the LPE-deposited film. In the first case it will consequently be necessary to operate with lower energies in the cavity than in the second.

In addition, in one case the index difference between the laser material 8 and the polymer 12 introduces an optical interface between the two media. In the other case, it is only possible to carry out LPE on the same material (e.g. YAG on YAG, only the doping differing), which limits the scope of the applications, but makes it possible to adjust the index of the epitaxied film to that of the active laser medium serving as the epitaxy substrate and therefore avoid the formation of an optical interface between the two media.

Finally, the nature of the film will influence the time form of the laser pulse. In the case of the organic dye dissolved in a polymer, the decay time of the dye is very short (~1 ns), whereas in the case of the epitaxied film the ions constituting the impurities ($Cr^{4+}$, $Er^{3+}$) have much longer decay times of approximately one microsecond. These properties will obviously condition the choice of the thin film as a function of the intended use.

According to another embodiment of the invention and as illustrated in FIG. 4a, it is possible to deposit a saturable absorber film 12,22 on either side of the active laser material 8, which makes it possible to absorb more energy of the pumping beam, but the film located on the side of the entrance of said beam will be subject to greater wear due to the pumping beam. References 14 and 15 represent the cavity entrance and exit mirrors.

Optionally and as illustrated in FIG. 5a, by a prior art method (publication 10) it is possible to produce an array of microlenses 16 made from a transparent material, such as silica or the like on the surface of the laser material 8. The typical dimensions of the microlenses are a diameter of one hundred to a few hundred microns and radii of curvature of a few hundred micrometers to a few millimeters.

These microlenses are used for producing "stable" cavities (the plane-plane cavity not being stable) of the planoconcave type as illustrated in FIGS. 2b or 4b in the case of the presence on the entrance face of a second, saturable absorber film 22. In the case of optical pumping, they also make it possible to focus the pumping beam.

In order to produce a complete laser cavity, the active medium with its saturable absorber or film or films will be located between two mirrors 14,15. The entrance mirror, deposited by known processes, will preferably be a dichroic mirror having a maximum reflectivity (as close as possible to 100%) at the wavelength of the laser and the highest possible transmission (>80%) at the wavelength of the pump (generally at about 800 nm for Nd-doped materials, 980 nm for Er-doped materials and 780 nm for Tm-doped materials). The exit mirror is also of the dichroic type, but permits the passage of a few percent of the laser beam. Thus, a laser cavity is obtained with the structures according to FIGS. 2a,2b and 4a,4b.

The advantage of such a structure is immediately apparent, because at no time does it require an optical alignment of the different components and it also does not introduce any optical adhesive, while avoiding the problems linked with a structure where the active medium is codoped with active laser ions and saturable absorber ions.

The pumping of this type of cavity is preferably an optical pumping. Thus, the III–V laser diodes are particularly suitable for pumping a microlaser cavity.

Figure 6A:
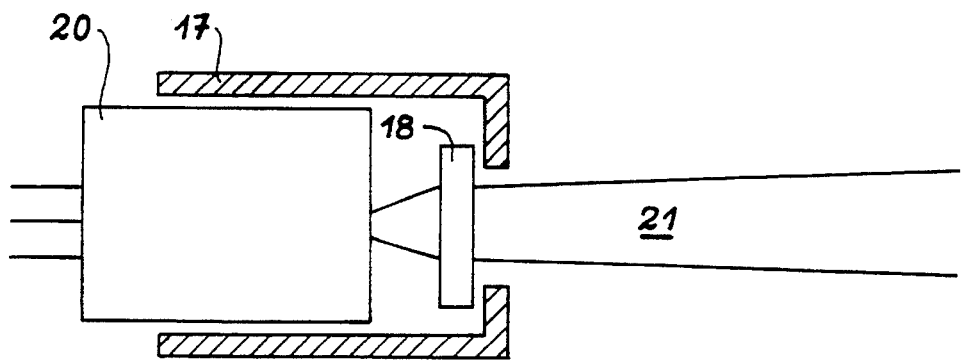
FIGS. 6a and 6b illustrate a microlaser according to the invention with its optical pumping means and the support case or cases for the different elements.
Figure 6B:
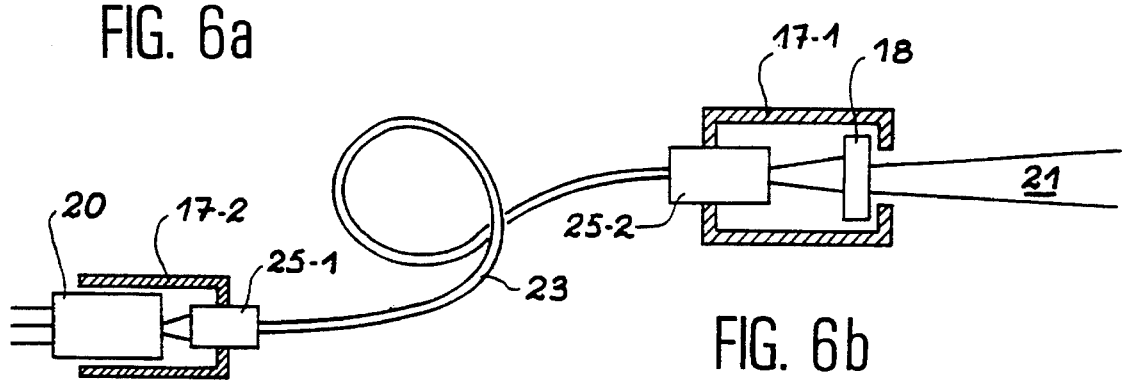

As illustrated in FIG. 6a, the microlaser cavity 18 can be installed in a mechanical box or case 17 for receiving the pumping laser diode 20. Reference 21 represents the pulsed laser beam. According to an embodiment illustrated in FIG. 6b it is also possible to have two separate cases 17-1 and 17-2, one for receiving the microlaser cavity 18 and the other for receiving the pumping laser diode 20, the two cases being connected by an optical fiber 23 with the aid of a connector provided in each box (25-1, 25-2).

The invention also relates to a process for the production of a microlaser cavity of the type described hereinabove.

This process involves seven successive stages.

1) The first stage consists of choosing the active laser material. A description has already been given hereinbefore of the different possible materials ($YVO_4$, YAG, LMA, etc.), as well as the different criteria enabling the expert to choose from among these materials.

Figure 7:
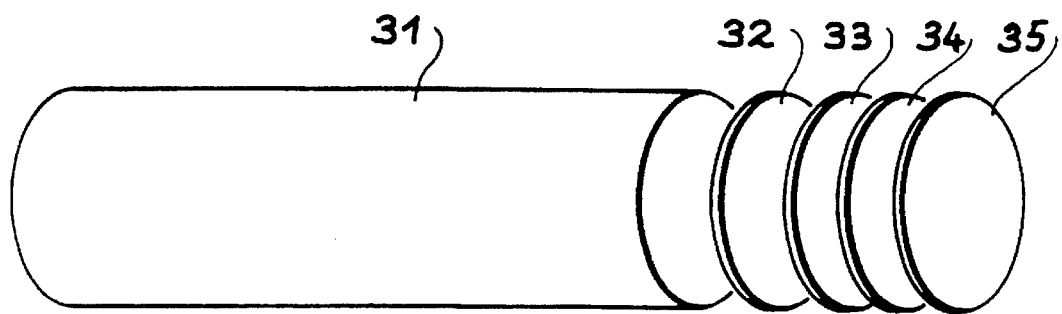
FIG. 7 shows a stage of the process of producing laser microcavities according to the invention.

2) The second stage (cf. FIG. 7) will be a conditioning stage of the laser crystal 31, which is oriented and cut into laminas of thickness between 0.5 and 5 mm (32,33,34,35).

3) The third stage involves the grinding and polishing of the laminas and has two objectives:

on the one hand to remove the surface cold working coating due to the cutting operation, on the other hand to bring the thickness of the laminas to a level slightly exceeding the specification of the microlaser— thus, as stated hereinbefore, the thickness of the active medium is an important criterion, which will condition the characteristics of the microlaser.

The ground laminas close to the final thickness are polished on both faces with an optical quality. Cutting, grinding and polishing are performed with known processes using known machines.

4) A stage of preparing and depositing a thin saturable absorber film. As stated hereinbefore two types of deposit can be made, corresponding to two preferred embodiments of the production process according to the invention.

a) First type of deposit: deposition of an organic, saturable absorber dye dissolved in a polymer:

Typically, for a microlaser operating at 1.06 µm, it is possible to use as the saturable absorber an organic dye such as bis(4-diethylaminodithiobenzyl)-nickel or BDN (Kodak, CAS No. 51449-18-4) in a polymethyl methacrylate (PMMA) solution.

For this purpose, preparation takes place of a solution containing 6% by weight of polymethyl methacrylate (Polyscience average weights) in chlorobenzene (Prolabo) stirring for 24 hours. This is followed by the addition of 0.2% by weight of BDN and stirring for an additional two hours. The solution is then filtered and deposited on the substrate exit face (opposite to the entrance face having the dichroic mirror) dropwise and using a centrifugal, circular movement. For this purpose it is possible to use a whirler, namely a standard machine such as that used in microelectronics for depositing resins used in lithographic operations. Previously all traces of impurities resulting from the polishing process are removed from the substrate. It is rotated (by a whirler) for 20 seconds at 2000 r.p.m. and then 30 seconds at 5000 r.p.m. The film is then left to dry for 2 hours in an oven at 70° C.

This gives a 1 µm thick film containing 3% of active molecules (BDN) and whose optical density is 0.13 at 1.06 µm (74% of transmission) prior to saturation. Such a saturable absorber has a relaxation time close to 10 ns and saturates at an intensity close to 1 $MW/cm^2$.

By varying the concentration parameters of the polymer, its molecular weight or its solvent, the dye proportion and the rotation speed of the whirler, it is possible to adjust the performance characteristics of the saturable absorber. The typical specifications obtained are:

film thickness: 1 to 5 µm, density of molecules: 5 to 10% by weight, dye: BDN, mm=685 g, glass transition: $T_g$=78° C., absorption at 1.06 µm: 10 to 70%, saturation rate: 90%, effective cross-section: $10^{-16}$ $cm^2$, relaxation time: 2 to 15 ns, saturation intensity: 0.1 to 1 $MW/cm^2$, non-uniformity of film: <5% on 1 $cm^2$, depolarization rate: $<10^{-5}$, losses at 800 nm: <1%, repetition frequency: 10–10,000 Hz, photostability: $10^8$, deposition method: whirler.

Other polymers such as polyvinyl alcohol, polyvinyl acetate or polystyrene can be used in their respective solvents in place of PMMA. It is also possible to use bis(4-dimethylaminodithiobenzyl)-nickel or BDN (Kodak, CAS No. 38465-55-3) as the dye.

The dye can also be incorporated into a silica gel or can be grafted on the polymer chain.

Numerous other metal complexes of dithiene can be used as the dye (publications 8 and 9) for other wavelengths. This method can also be used for switching lasers operating at wavelengths other than 1.06 µm. For example, Er or Er+Yb lasers (Er or Er+Yb-doped materials where the active ion is Er) emitting at around 1.5 µm will be switched with tetraethyloctahydrotetraazapentaphene-dithiolato-nickel (reference 9).

b) Second type of deposit: deposition of a film by liquid phase epitaxy (LPE)

The saturable absorber or SA film is obtained by immersing the substrate on which it has been deposited in an appropriately chosen, supersaturated solution. Said solution or epitaxy bath is a mixture of a solvent and a solute constituted by different elements forming the final material. The substrate and the film have the same crystal structure and only differ by the dopants affecting the crystalline and optical properties of the film. The active ions such as Nd, Er and Yb make the material amplifying, whereas other ions (Cr, Er) give it SA properties and certain others can be used for varying the refractive index or the crystal lattice of the material (e.g. Ga, Ge, Lu, etc.). Thus, it is possible to control the properties of the films produced.

This process is applicable to any material in the form of monocrystals (for producing substrates) and which can be prepared by liquid phase epitaxy. This is the case with the materials referred to hereinbefore for the base material of the active laser medium: $Y_3Al_5O_{12}$ (YAG), $Y_2SiO_5$ (YSO), $YVO_4$, $YLiF_4$ (YLF) or $GdVO_4$. The composition of the bath (choice of solvent and substituents), the concentrations in the solute of the different oxides and the experimental growth conditions (range of temperatures, operating mode, etc.) are adjusted for each material in order to obtain films having the best possible crystalline quality.

In the case of garnets (YAG), the chosen solvent is a $PbO/B_2O_3$ mixture and the solute comprises an excess of $Al_2O_3$ in order to stabilize the garnet phase. The solute/solvent ratio is then calculated so as to obtain growth at about 1000° C.

As a function of the bath composition, the temperature and the deposition time, it is possible to adjust the thickness ($1<e<200$ μm) and the dopant concentration in the films. The growth of a film takes place at a constant temperature, which makes it possible to obtain a homogeneous dopant concentration in the film thickness. The substrate performs an alternating or uniform rotary movement, which leads to a good thickness homogeneity.

It is possible to produce a substrate carrying one or two SA films (FIGS. 2a, 2b, 4a, 4b) depending on whether one face of the active laser material is immersed in the bath on the surface thereof, or whether this applies to both faces, the laser material being totally immersed in the bath.

The epitaxied face or faces obtained can be repolished in order to remove roughness possibly caused by the epitaxy process and to bring the thickness of said films to the desired value for the operation of the microlaser.

5) A stage of depositing the entrance mirror. This is a dichroic mirror obtained by the deposition of dielectric multilayers, which is a known process which is commercially available. Stage 5 (entrance mirror deposition) can be performed before or after stage 4 in the case of the SA polymer deposit, but must be carried out after stage 4 in the case of liquid phase epitaxy, which takes place at a high temperature and may destroy the mirror.

6) A stage of depositing the exit mirror on the film. Use will be made of the same procedures as in stage 5).

Figure 8:
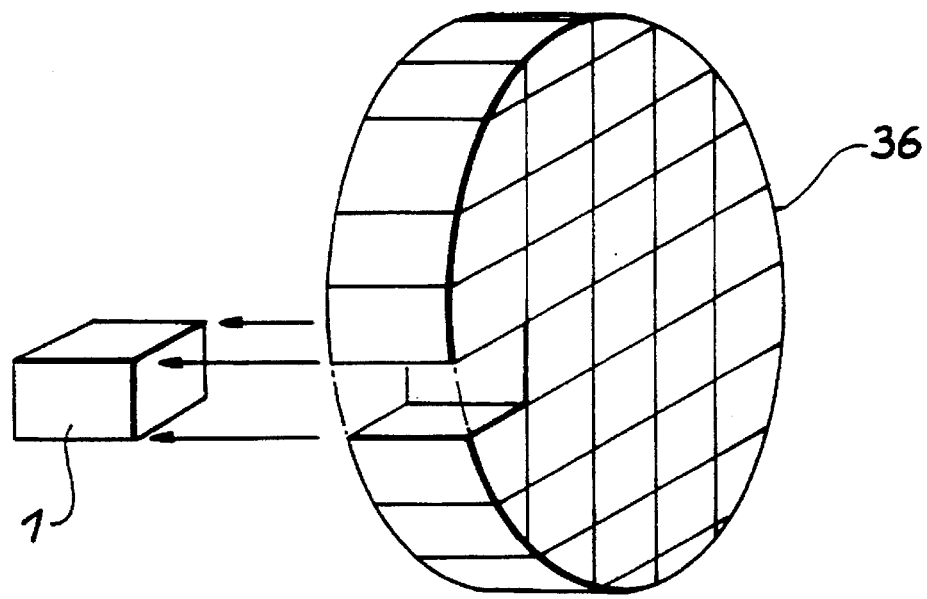
FIG. 8 shows the stage of cutting up microlaser chips in a lamina constituted by a stack of films of laser material (optionally with microlenses), saturable absorber and mirrors.

7) A stage of cutting laminas in order to obtain microlaser chips (cf. FIG. 8).

Plates 36 having the mirrors, the saturable absorber and the active laser medium and optionally the microlenses are cut by a diamond saw (of the type used in microelectronics for cutting Si chips), in order to obtain laser chips 1 with a cross-section of a few $mm^2$ (FIG. 8, the lines on the plate 36 representing the cutting lines).

A supplementary stage can be used before stage 4), if it is wished to produce on one or other face of the polished lamina obtained in stage 3) a microlens array.

A preferred embodiment of said supplementary stage consists of directly etching the microlenses on the laser material using procedures currently used in microelectronics (FIG. 5a).

Another embodiment of this stage consists of firstly producing said microlenses on another material (photosensitive resin, silica, etc.) and then hybridizing them (by bonding with an optical adhesive 11 or by face-to-face contact) with the polished face of the laser material 8 (FIG. 5b).

The above-described production process offers the possibility of the mass production of microlasers at low cost, which is indispensable for application in fields such as cars.

Moreover, the thus produced microlaser has the advantages referred to hereinbefore, namely it is monolithic, i.e. flexible to use, and requires no optical setting or alignment, because the monolithic production process permits self-alignment of the laser.

Among the possible industrial applications of the microlasers, reference can be made to laser telemetry, laser marking and micromachining, laser injection for power lasers, He magnetometry, the detection of pollutants, scientific and medical instrumentation.

Moreover, the combination of microlasers and microoptical technologies (microlenses), while maintaining the advantage of collective manufacture and low costs makes it possible:

to improve the performance characteristics of the microlasers (stable cavities, pump focussing), produce optical microsystems for particular applications such as:

the production of 2D arrays (optionally addressable), the micro-lidar (teledetection of wind speed, pollution, etc.), the detection of obstacles for cars, laser telemetry, low cost, compact laser marking machines.

Several of these applications, particularly marking, microlidar, obstacle detection and telemetry require high peak powers and therefore switched operation. The microlaser according to the invention is very suitable for such applications.

Publications quoted in the present description.

1. N. Mermilliod et al., Appl. Phys. Letters 59(27), 3519 (1991).
2. J. J. Zayhowski The Lincoln Laboratory Journal 3(3), 427 (1990).
3. W. Koechner "Solid State Laser Engineering", Springer-Verlag 1988.
4. Shouhuan Zhou et al., Optics Letters 18(7), 511 (1993).
5. I. J. Miller et al., Advanced Solid State Lasers conf., Santa Fe 1992.
6. K. Spariosu et al., Appl. Phys. Letters 62(22), 2763 (1993).
7. R. Wisnieff et al., Laser Cartridge Concept Development Study, Final report. Army electronics command, Fort Monmouth, N.J., report No: 1294-R-0018; ECOM-74-0376-F, April 1976.
8. K. H. Drexhage et al., Optics Communications 10(1), 19 (1974).
9. Mueller-Westerhoff, Mol. Cryst. Liq. Cryst. 183, 291 (1990).
10. A. Eda et al., CLEO'92, paper CWG33, p.282 (Conf. on Laser and Electro-optics, Anaheim, USA, May 1992).

We claim:

1. A microlaser cavity which comprises:

a solid, active medium, a saturable absorber, an entrance mirror and an exit mirror, wherein the saturable absorber comprises a thin saturable absorber material film directly deposited on the solid, active medium.

2. A microlaser cavity according to claim 1, wherein the solid, active medium comprises a base material selected from the group consisting of $Y_3Al_5O_{12}$, $LaMgA_{11}O_{19}$, $YVO_4$, $Y_2SiO_5$, $YLiF_4$ or $GdVO_4$, doped with ions of neodymium (nd), erbium (Er), thulium (Tm), holmium (Ho), or a codoping of thulium and holmium (Tm+Ho).

3. A microlaser cavity according to claims 1 or 2, wherein the thin film is formed from an organic dye dissolved in a polymer solvent.

4. A microlaser cavity according to claim 3, wherein the organic dye is selected from the group consisting of bis(4-diethylaminodithiobenzyl)-nickel or bis(4-dimethylaminodithiobenzyl)-nickel and the solvent comprises a solution of polymethyl methacrylate (PMMA), polyvinyl alcohol, polyvinyl acetate or polystyrene.

5. A microlaser cavity according to claim 2, wherein the thin film is deposited by liquid phase epitaxy, and the film is formed from a base material identical to that of the solid, active medium and doped with $Cr^{+4}$ or $Er^{3+}$ ions.

6. A microlaser cavity according to one of claims 1 or 2, wherein the laser cavity comprises a second saturable absorber film.

7. A microlaser cavity according to claim 1, wherein the thin film is deposited by liquid phase epitaxy.

8. A microlaser cavity according to claim 1, which comprises a microlens array directly formed on the laser material.

9. A microlaser cavity according to claim 1, wherein the entrance mirror and the exit mirror comprise dichroic mirrors.

10. A microlaser, which comprises:
a microlaser cavity according to claim 1 and optical means for pumping the cavity.

11. Microlaser according to claim 10, wherein the pumping means comprises at least one laser diode.

12. Microlaser according to one of the claims 10 or 11, wherein the laser cavity and the optical pumping means are installed in a case.

13. Microlaser according to one claims 10 or 11, wherein the microlaser cavity and the optical pumping means are each installed in different cases, the cases being linked by an optical fiber.

14. A microlaser which comprises:
a microlaser cavity according to claim 1, and an optical pump, said optical pump pumping the cavity.

15. The microlaser according to claim 14, wherein the optical pump comprises at least one laser diode.

16. A microlaser according to one of claims 14 or 15, wherein the laser cavity and the optical pump are installed in a case.

17. A microlaser according to one of claims 14 or 15, wherein the microlaser cavity and the optical pump are each installed in difference cases, the cases being linked by an optical fiber.

18. A process for the production of a microlaser cavity having a solid, active medium, a saturable absorber, and entrance mirror and an exit mirror, wherein the saturable absorber includes a thin soluble absorber material film directly deposited on the solid, active medium, which comprises:

a conditioning stage, at a predetermined thickness, of the material forming the solid, active medium, a stage of forming a saturable absorber film directly on one of the faces of the material prepared according to the preceding stage.

19. Process according to claim 18, wherein the thin film is deposited with a whirler.

20. Process according to one of claims 18 or 19, wherein the thin film is formed from an organic dye dissolved in a polymer solvent.

21. Process according to claim 20, wherein the organic dye is selected from a group consisting of bis(4-diethylaminodithiobenzyl)-nickel or bis(4-dimethylaminodithiobenzyl)-nickel and the solvent comprises a solution of polymethyl methacrylate (PMMA), polyvinyl alcohol, polyvinyl acetate or polystyrene.

22. Process according to claim 18, which comprises depositing the thin film by liquid phase epitaxy.

23. Process according to claim 22, wherein the solid, active medium comprises a base material selected from the group consisting of $Y_3Al_5O_{12}$, $LaMgA_{11}O_{19}$, $YVO_4$, $Y_2SiO_5$, $YLiF_4$ or $GdVO_4$, doped with ions of neodymium (Nd), erbium (Er), thulium (Tm), holmium (Ho), or with a codoping of erbium and ytterbium (Er+Yb) ions, or with a codoping of thulium and holmium (Tm+Ho).

24. Process according to claim 23, which comprises forming the thin film from a base material identical to that of the active laser material, and doping said base material with $Cr^{+4}$ or $Er^{3+}$ ions.

25. Process according to claim 18, which comprises depositing a second saturable absorber film on another face of the active laser material.

26. Process according to claim 18, which comprises forming in a supplementary stage a microlens array directly on the laser material.

27. Process according to claim 26, which comprises etching the microlens array directly on the active laser material.

28. Process according to claim 18, which comprises forming an entrance mirror and an exit mirror of the microlaser cavity by the deposition of dielectric multilayers.

* * * * *

UNITED STATES PATENT AND TRADEMARK OFFICE
CERTIFICATE OF CORRECTION

PATENT NO. :    5,495,494
DATED       :    February 27, 1996
INVENTOR(S) :    Engin MOLVA et al.

It is certified that error appears in the above-indentified patent and that said Letters Patent is hereby corrected as shown below:

On the title page, Item [75], the fourth inventor's place of residence is spelled incorrectly. It should read:

--[75] Inventors:  Engin Molva, Grenoble; Jean-Jacques Aubert, Sassenage; Jean Marty, Seyssins; Jean-Michel Nunzi, Antony, all of France--

Signed and Sealed this

Twenty-third Day of March, 1999

Attest:

Q. TODD DICKINSON

Attesting Officer

Acting Commissioner of Patents and Trademarks